H. M. RUSSELL, Jr.
SLIDING GEAR MECHANISM.
APPLICATION FILED MAY 14, 1909.
935,328.
Patented Sept. 28, 1909.
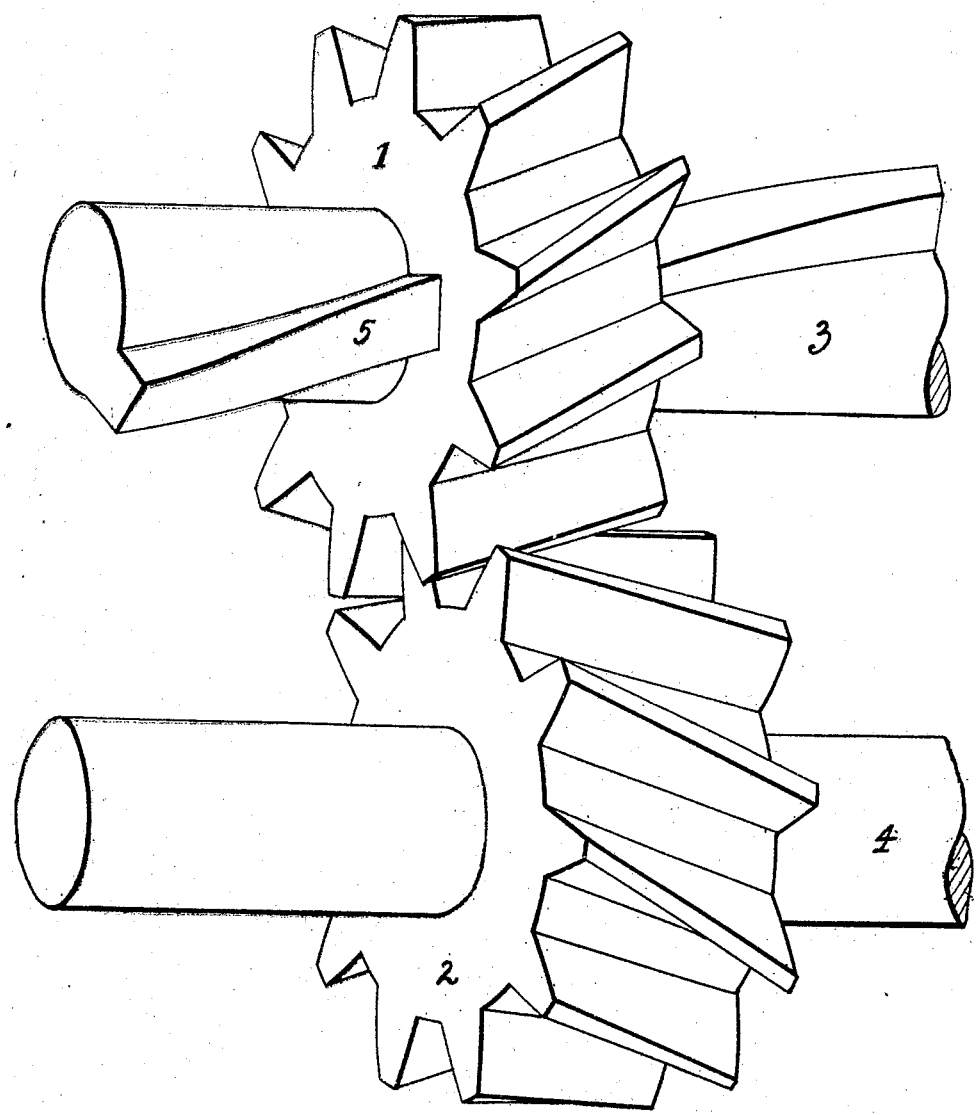
WITNESSES:
INVENTOR.

UNITED STATES PATENT OFFICE.

HENRY M. RUSSELL, JR., OF WHEELING, WEST VIRGINIA.

SLIDING-GEAR MECHANISM.

935,328.　　Specification of Letters Patent.　Patented Sept. 28, 1909.

Application filed May 14, 1909. Serial No. 495,859.

*To all whom it may concern:*

Be it known that I, HENRY M. RUSSELL, Jr., of Wheeling, Ohio county, West Virginia, have invented a new and useful Improvement in Sliding-Gear Mechanisms, of which the following is a description, reference being had to the accompanying drawing, forming part of this specification, in which the figure is an isometric view of the improvement.

My invention relates to sliding gear mechanisms used for various purposes but particularly to those used for speed changing in automobiles.

One object of my invention is to permit the use of helical gearing and at the same time to permit the gears to be slid into and out of mesh while their shafts are stationary.

Another object of my invention is to permit a helical gear to be mounted so that it may slide along its shaft but so that the end thrust due to the helical form of tooth will not tend to make the gear slide along its shaft.

My invention consists of two helical gears on parallel shafts, one of the shafts having a helical spline on it of the same pitch as that of the gears, and one of the said gears being free to slide along the said shaft and spline.

In the figure the numerals 1 and 2 respectively refer to the gears. The numerals 3 and 4 respectively refer to the shafts and the numeral 5 refers to the spline on the shaft 3. The gear 1 is supposed to fit over the shaft 3 and the spline 5. The spline 5 has the same pitch as the teeth of the gear 1, that is to say, if both the spline and a tooth be produced they will pass completely around the shaft in the same distance measured lengthwise.

It will be seen that there will be no tendency for the gears to squeeze out of mesh since the end thrust due to the form of tooth is exactly counteracted by the shape of the spline. It will also be seen that the gears may be slid out of and into mesh while the shafts are stationary just as with the present straight gears.

The advantage claimed for my invention is that it permits the use of helical gears in a sliding gear mechanism, such gears being smoother and quieter in action than the gears now employed.

In the claims the word "helical" is used in the ordinary mechanical acceptation of the word and is not intended to be confined to a true helix. Any shape planed by a gear planing machine which had been set to plane a helical gear would be helical in the sense in which that word is used herein. The words "in the same sense" are also used. By this is meant that two helical forms are either both similar to a right-handed screw or both similar to a left-handed screw.

I claim:—

1. In a sliding gear mechanism the combination of a shaft, a gear sliding thereon, the said shaft being so shaped that the gear cannot rotate independently of the shaft, and the said shaft and the said gear both being uniformly and equally twisted and in the same sense about the axis of the said shaft.

2. In a sliding gear mechanism the combination of a shaft, a helical spline on the said shaft, a helical gear sliding on the said shaft and fitting over the said spline, the pitch of the said spline and of the said helical gear being equal and in the same sense.

3. In a sliding gear mechanism the combination of two shafts, two helical gears mounted respectively on the said shafts, a helical spline on one of the said shafts and of the same pitch as the said gears, one of the said gears being adapted to slide along the shaft with the spline, and having a groove cut in it to fit the said spline.

4. In a sliding gear mechanism the combination of two shafts, a helical spline on one of them, two helical gears, one of the said gears fitting over the said shaft and spline and being adapted to slide thereon, the other gear being rigidly fastened to the other shaft, the said spline being so shaped that it will produce an end thrust equal and opposite to that produced by the helical tooth form when power is transmitted through the gears.

5. In a sliding gear mechanism the combination of two shafts a spline on one of them, two gears, one sliding on the shaft with the spline, the other fixed on the other shaft, the said shaft with the spline and the gear on it being uniformly and equally twisted in the same sense and the other gear being uniformly and equally twisted in the opposite sense.

HENRY M. RUSSELL, JR.

Witnesses:
　G. A. FEENY,
　J. H. BRENNAN.